United States Patent
Klatt et al.

(10) Patent No.: US 8,785,534 B2
(45) Date of Patent: Jul. 22, 2014

(54) USE OF POLYAMIDES THAT ARE RESISTANT TO CORROSION AND STRESS CRACKING

(75) Inventors: Martin Klatt, Mannheim (DE); Manoranjan Prusty, Mannheim (DE); Axel Wilms, Frankenthal (DE); Anka Bernnat, Schifferstadt (DE); Martin Baumert, Dossenheim (DE); Raquel Fernandez Rodiles, Heidelberg (DE); Philippe Desbois, Edingen-Neckarhausen (DE); Jochen Engelmann, Neustadt (DE); Byung Seok Kim, Singapore (SG)

(73) Assignee: BASF SE (DE)

( * ) Notice: Subject to any disclaimer, the term of this patent is extended or adjusted under 35 U.S.C. 154(b) by 7 days.

(21) Appl. No.: 13/637,894

(22) PCT Filed: Mar. 29, 2011

(86) PCT No.: PCT/EP2011/054784
§ 371 (c)(1),
(2), (4) Date: Sep. 27, 2012

(87) PCT Pub. No.: WO2011/120949
PCT Pub. Date: Oct. 6, 2011

(65) Prior Publication Data
US 2013/0023613 A1 Jan. 24, 2013

(30) Foreign Application Priority Data
Mar. 30, 2010 (EP) .................................... 10158447

(51) Int. Cl.
*C08K 3/10* (2006.01)
*C08K 3/16* (2006.01)

(52) U.S. Cl.
USPC ............ 524/413; 524/258; 524/322; 524/487

(58) Field of Classification Search
USPC .................. 524/258, 322, 487, 413
See application file for complete search history.

(56) References Cited

U.S. PATENT DOCUMENTS 6,046,141 A    4/2000  Kurz et al.

FOREIGN PATENT DOCUMENTS

| EP | 0392602 A1 | 10/1990 |
|----|------------|---------|
| EP | 0333408 B1 | 8/1994 |
| EP | 0905190 B1 | 4/2005 |
| GB | 1226964 A | 3/1971 |
| JP | 60088067 U | 6/1985 |

OTHER PUBLICATIONS

International Search Report for PCT/EP2011/054784 mailed Jul. 6, 2011.
International Preliminary Report on Patentability for PCT/EP2011/054784 mailed Jul. 16, 2012.
Wyzgoski, Michael G., et al., "Stress Cracking of Nylon Polymers in Aqueous Salt Solutions", J. Mat. Sci., vol. 22, (1987), pp. 1707-1714.
Wyzgoski, Michael G., et al., "Stress Cracking of Nylon Polymers in Aqueous Salt Solutions", J. Mat. Sci., vol. 22, (1987), pp. 1715-1723.
Wyzgoski, Michael G., et al., "Stress Cracking of Nylon Polymers in Aqueous Salt Solutions", J. Mat. Sci., vol. 22, (1987), pp. 2615-2623.
Weiske, C.D., "Chemische Beständigkeit und Spannungsrißkorrosion von Polyamiden", Kunststoffe, vol. 54, (1964), pp. 626-634.
Translation of the International Preliminary Report on Patentability for PCT/EP2011/054784 dated Oct. 1, 2012.

*Primary Examiner* — Peter Szekely
(74) *Attorney, Agent, or Firm* — Novak Druce Connolly Bove + Quigg LLP

(57) ABSTRACT

The use of thermoplastic molding materials comprising
A) 10 to 98.8% by weight of a mixture formed from
  a1) 40 to 70% by weight of nylon-6,6 or nylon-4,6 or nylon-6 or mixtures thereof,
  a2) 30 to 60% by weight of a polyamide having a ratio of methylene to amide groups of 7 to 12,
B) 1 to 50% by weight of a fibrous or particulate filler,
C) 0.1 to 3% by weight of a lubricant,
D) 0.05 to 3% by weight of a heat stabilizer,
E) 0 to 40% by weight of further additives,
where the sum of the percentages by weight A) to E) and a1) and a2) adds to 100%, for production of stress cracking- and corrosion-resistant moldings.

8 Claims, No Drawings

USE OF POLYAMIDES THAT ARE RESISTANT TO CORROSION AND STRESS CRACKING

CROSS-REFERENCE TO RELATED APPLICATIONS

This application is a national stage application (under 35 U.S.C. §371) of PCT/EP2011/054784, filed Mar. 29, 2011, which claims benefit of European Application No. 10158447.2, filed Mar. 30, 2010, both of which are incorporated herein by reference in their entirety.

The invention relates to the use of thermoplastic molding materials comprising
A) 10 to 98.8% by weight of a mixture formed from
   a1) 40 to 70% by weight of nylon-6,6 or nylon-4,6 or nylon-6 or mixtures thereof,
   a2) 30 to 60% by weight of a polyamide having a ratio of methylene to amide groups of 7 to 12,
B) 1 to 50% by weight of a fibrous or particulate filler,
C) 0.1 to 3% by weight of a lubricant,
D) 0.05 to 3% by weight of a heat stabilizer,
E) 0 to 40% by weight of further additives,
where the sum of the percentages by weight A) to E) and a1) and a2) adds up to 100%, for production of stress cracking- and corrosion-resistant moldings.

The invention further relates to the moldings of all kinds obtainable in this context, especially motor vehicle components.

It is known that polyamides are sensitive to stress cracking corrosion on contact with particular substances, especially on contact with particular salts, generally in combination with water, for example calcium chloride and zinc chloride, see, for example, the following literature:

Wyzgoski, Novak, J. Mat. Sci., 22, 1707-1714 (1987), Stress cracking of nylon polymers in aqueous salt solutions, part I: Stress rupture behaviour, Wyzgoski, Novak, J. Mat. Sci., 22, 1715-1723 (1987), Stress cracking of nylon polymers in aqueous salt solutions, part II: Nylon-salt interactions, Wyzgoski, Novak, J. Mat. Sci., 22, 2615-1623 (1987), Stress cracking of nylon polymers in aqueous salt solutions, part III: Craze growth kinetics, Weiske, Kunststoffe, 54, 626-634 (1964), Chemische Beständigkeit and Spannungsrisskorrosion von Polyamiden.

Salts such as calcium chloride are used, for example, as deicing salt on roads in winter and can then come into contact with plastic parts and cause stress cracking corrosion, i.e. lead to crack formation in the event of simultaneous action of stresses on the plastic parts.

It is known practice to mix polyamides having a high number of methylene groups in one monomer component (e.g. polyamides with monomer components with numbers of methylene groups of 9-12, for example PA6.10, PA12, PA6.12) with polyamides with a small number of methylene groups in each component (e.g. numbers of methylene groups of 4-6, for example PA6, PA6.6). This is also described in the following applications:
JP-A 57/080449
JP-A 04/309561
JP-A 60/088,066

The prior art describes mixtures of nylon-6,6 with polyamides having a higher number of methylene groups in a monomer component than for nylon-6,6. However, it is merely the mixing of the polyamides that is described as advantageous for the chemical stability, and not the possibility of further improvement in the chemical stability resulting from further additives in these mixtures. In addition, according to application JP-A 04/309561, the particular stability of the polyamide mixtures is attained by establishing a specific layer structure in the mixture. In addition, the stability of the mixtures according to application JP-A 60/088,066 is attained only in the case of use of polyamides with a particular ratio of the relative viscosities of the starting polyamides.

It was therefore an object of the present invention to find the improved use of polyamide molding materials for production of moldings, which, by virtue of a specific additive combination and polymer matrix, gives rise to moldings, especially for the automotive sector, which have better stress cracking resistance and corrosion resistance.

Accordingly, the use defined at the outset has been found. Preferred embodiments can be inferred from the dependent claims.

As component A), the molding materials usable in accordance with the invention comprise 10 to 98.8%, preferably 20 to 94% and more preferably 25 to 89% by weight of a polyamide mixture formed from:
a1) 40 to 70% by weight, preferably 60 to 50% by weight, of nylon-6,6 or nylon-4,6 or nylon-6 or mixtures thereof,
a2) 30 to 60% by weight, preferably 50 to 40% by weight, of a polyamide having a ratio of methylene to amide groups of 7 to 12.

Suitable polyamides a2) are aliphatic polyamides PA 12, PA 6.12, PA 11, PA 12.12, PA 10.10, PA 6.11, PA 4.8, PA 4.10, PA 4.12, PA 9, PA 9.10, PA 9.12, particular preference being given to nylon-6,10.

Processes for preparing such polyamides are known to those skilled in the art, and so there is no need for any further details.

The polyamides of the inventive molding materials generally have a viscosity number of 70 to 350 and preferably of 70 to 200 ml/g, determined in a 0.5% by weight solution in 96% by weight sulfuric acid at 25° C. to ISO 307.

Fibrous or particulate fillers B) include carbon fibers, glass fibers, glass beads, amorphous silica, calcium silicate, calcium metasilicate, magnesium carbonate, kaolin, chalk, powdered quartz, mica, barium sulfate and feldspar, which are used in amounts of 1 to 50% by weight, especially 5 to 40% and preferably 10 to 35% by weight.

Preferred fibrous fillers include carbon fibers, aramid fibers and potassium titanate fibers, particular preference being given to glass fibers in the form of E glass. These can be used in the form of rovings or chopped glass in the commercial forms.

For better compatibility with the thermoplastic, the fibrous fillers may be surface treated with a silane compound.

Suitable silane compounds are those of the general formula

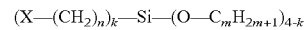

in which the substituents are each defined as follows:
X is

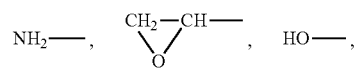

n is an integer from 2 to 10, preferably 3 to 4,
m is an integer from 1 to 5, preferably 1 to 2,
k is an integer from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as the X substituent.

The silane compounds are generally used in amounts of 0.01 to 2, preferably 0.025 to 1.0 and especially 0.05 to 0.5% by weight (based on E)) for surface coating.

Also suitable are acicular mineral fillers.

In the context of the invention, acicular mineral fillers are understood to mean a mineral filler with highly pronounced acicular character. One example is acicular wollastonite. The mineral preferably has a L/D (length/diameter) ratio of 8:1 to 35:1, preferably of 8:1 to 11:1. The mineral filler may optionally be pretreated with the aforementioned silane compounds; however, the pretreatment is not absolutely necessary.

Further fillers include kaolin, calcined kaolin, wollastonite, talc and chalk, and additionally platelet-shaped or acicular nanofillers, preferably in amounts between 0.1 and 10%. For this purpose, preference is given to using boehmite, bentonite, montmorillonite, vermiculite, hectorite and laponite. In order to obtain good compatibility of the platelet-shaped nanofillers with the organic binder, the platelet-shaped nanofillers according to the prior art are organically modified. The addition of the platelet-shaped or acicular nanofillers to the inventive nanocomposites leads to a further increase in mechanical stability.

As component C), the inventive molding materials comprise 0.05 to 3%, preferably 0.1 to 1.5% and especially 0.1 to 1% by weight of a lubricant.

Preference is given to aluminum salts, alkali metal salts, alkaline earth metal salts, or esters or amides, of fatty acids having 10 to 44 carbon atoms, preferably having 12 to 44 carbon atoms.

The metal ions are preferably alkaline earth metal ions and Al, particular preference being given to Ca or Mg.

Preferred metal salts are calcium stearate and calcium montanate, and also aluminum stearate.

It is also possible to use mixtures of different salts, the mixing ratio being as desired.

Preferred lubricants C) do not have any metal ions, i.e. they are ion-free.

The carboxylic acids may be mono- or dibasic. Example include pelargonic acid, palmitic acid, lauric acid, margaric acid, dodecanedioic acid, behenic acid, and more preferably stearic acid, capric acid and montanic acid (mixture of fatty acids having 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines may be mono- to trifunctional. Examples thereof are stearylamine, ethylenediamine, propylenediamine, hexamethylenediamine, di(6-aminohexyl) amine, particular preference being given to ethylenediamine and hexamethylenediamine. Preferred esters or amides are correspondingly glyceryl distearate, glyceryl tristearate, ethylenediamine distearate, glyceryl monopalmitate, glyceryl trilaurate, glyceryl monobehenate and pentaerythrityl tetrastearate.

It is also possible to use mixtures of different esters or amides or esters with amides in combination, the mixing ratio being as desired.

A further group of preferred lubricants is that of polyolefin waxes.

Polypropylene waxes are generally understood to mean polypropylenes with waxy character, which correspondingly have a low molecular weight.

The inventive waxes have a mean molecular weight (weight average) Mw of 2000 to 60 000 (by means of GPC with polystyrene standard), preferably of 5000 to 50 000 and especially of 10 000 to 45 000.

The softening point of the inventive waxes is preferably at least 140° C., preferably at least 150° C., determined to DIN EN 1427 (ring and ball method).

The viscosity of the inventive waxes is generally from 10 to 5000 mPas, preferably from 100 to 3000 mPas, at 170° C. to DIN 53018.

The density of the inventive waxes is typically from 0.87 to 0.92 g/cm$^3$, preferably from 0.88 to 0.91 g/cm$^3$, to DIN 53479.

Preferred PP waxes take the form of "micropowders", the $d_{50}$ of which is from 1 to 50 µm, preferably from 5 to 30 µm.

Nonpolar PP waxes in the context of the invention are understood to mean, according to Ullmann's Encyclopedia of Industrial Chemistry, 6th edition, heading: 6.1.5 Polar polyolefin waxes, Verlag Chemie, 2000, waxes without incorporation of polar groups (especially of carboxyl and/or ester groups).

The inventive PP waxes can be prepared in stirred high-pressure autoclaves or in high-pressure tubular reactors using regulators. Preparation in stirred high-pressure autoclaves is preferred. The stirred high-pressure autoclaves employed for the process according to the invention are known per se; a description can be found in Ullmann's Encyclopedia of Industrial Chemistry, 5th edition, heading: Waxes, vol. A 28, p. 146 ff., Verlag Chemie Weinheim, Basle, Cambridge, New York, Tokyo, 1996. The length/diameter ratio therein varies predominantly within ranges from 5:1 to 30:1, preferably 10:1 to 20:1. The high-pressure tubular reactors which can equally be employed are likewise found in Ullmann's Encyclopedia of Industrial Chemistry, 5th edition, heading: Waxes, vol. A 28, p. 146 ff., Verlag Chemie Weinheim, Basle, Cambridge, New York, Tokyo, 1996.

A further customary preparation method according to Ullmann (see above) is the depolymerization of polypropylenes with higher molar masses.

The commercially available PP waxes are translucent, colorless to white powder products which give clear melts and are soluble in nonpolar solvents.

Preferred products are Licowax® PP, especially Licowax PP 230 and Licowax VP PP products (from Clariant GmbH) and Ceridust® VP 6071, and also LC 525 N, LC 502 N, LC 502 NC, LC 503 N, LC 503 NC products from Hana Corporation, Korea.

Polyethylene waxes (PE waxes) are obtainable by free-radical polymerization in a high-pressure process or in the presence of organometallic catalysts in a low-pressure process prepared hydrocarbon waxes with a mean molar mass range of 2000-20 000 (mass average). In addition, it is possible to obtain low molecular weight products with waxy character by thermal degradation from high molecular weight polyethylene.

In general, polyethylene waxes are not classified according to the preparation method but according to the density, as HDPE (high density polyethylene) and LDPE (low density polyethylene), the high-pressure process giving rise to HDPE, and the low-pressure process to LDPE qualities.

According to the production process, different property profiles are obtained:

|  | High-pressure PE waxes (HDPE) | Low-pressure PE waxes (LDPE) |
| --- | --- | --- |
| Melting range [° C.] | 96-105 | 117-135 |
| Density [ρ] | 0.92-0.95 (23° C.) | 0.96-0.98 (20° C.) |

-continued

|  | High-pressure PE waxes (HDPE) | Low-pressure PE waxes (LDPE) |
|---|---|---|
| Crystallinity | low, pronounced branching | high, brittleness, hardness, essentially straight-chain |

The properties of the thermally degraded PE waxes are similar to those of the high-pressure products. By altering the process regime, branched types of low density (LDPE) are also obtainable.

By oxidation with air or oxygen, more polar oxidized PE waxes (polyethylene wax oxidates) are obtained.

Useful starting materials for such oxidation processes include all customary polyolefin waxes, i.e., for example, polyolefin waxes prepared by Ziegler or Phillips catalysis or by high-pressure processes. The starting waxes may be taken directly from a polymerization process or obtained by thermal cleavage of high molecular weight olefin polymers.

Very suitable waxes derive, for example, from ethylene and/or $C_3$-$C_{10}$-alk-1-enes, such as from propylene, 1-butene, 1-pentene, 1-hexene, 1-heptene, 1-octene, 1-nonene and 1-decene. The polyolefin waxes used are preferably homo- or copolymers of ethylene or of propylene, more preferably those of ethylene.

To prepare the starting polyolefin waxes, the monomers can be homopolymerized, or copolymerized with one another in any ratio. Preferred polyolefins on which the oxidized waxes are based are ethylene homopolymers having a density in the range from 0.89 to 0.98 g/cm$^3$, preferably in the range from 0.90 to 0.96 g/cm$^3$, and an $M_w$, determined by the GPC method in 1,2,4-trichlorobenzene at 135° C. with a polyethylene or polypropylene standard, in the range from 1000 to 40 000 g/mol, preferably in the range from 2000 to 20 000 g/mol.

Further suitable starting polyolefins are ethylene/$C_3$- to $C_{10}$-alk-1-ene copolymers with a total content of structural units originating from the alk-1-ene or the alk-1-enes in the copolymer in the range from 0.1 to 15 mol %, preferably in the range from 1 to 10 mol %, based on the copolymer. Preferred ethylene/alk-1-ene copolymers are ethylene/propylene copolymers having a content of structural units originating from the propylene in the copolymer in the range from 0.1 to 10 mol %, preferably in the range from 1 to 5 mol %, based on the copolymer. The copolymers generally have an $M_w$, determined by the GPC method as described above, in the range from 1000 to 40 000 g/mol, preferably in the range from 2000 to 20 000 g/mol.

Further preferred polyolefins on which the oxidized waxes may be based are isotactic propylene homopolymers having a pentadecene content (content of isotactic pentadecene) determined by the $^{13}$C NMR spectroscopy method, in the range from 90 to 98%, and an $M_w$, determined by the GPC method as described above, in the range from 1000 to 40 000 g/mol, preferably in the range from 2000 to 20 000 g/mol.

Also suitable are copolymers of propylene with ethylene and/or $C_4$- to $C_{10}$-alk-1-enes as base polyolefins. These propylene copolymers typically have a total content of structural units originating from the ethylene and/or the $C_4$- to $C_{10}$-alk-1-enes in the copolymer in the range from 0.1 to 15 mol %, preferably in the range from 1 to 10 mol %, based on the copolymer. Preferred propylene copolymers are propylene/ethylene copolymers having a content of structural units originating from the ethylene in the copolymer in the range from 0.1 to 10 mol %, preferably in the range from 1 to 5 mol %, based on the copolymer. The propylene copolymers generally have an $M_w$, determined by the GPC method as described above, in the range from 1000 to 40 000 g/mol, preferably in the range from 1000 to 20 000 g/mol.

The acid number of the preferred oxidized waxes (to DIN 53402, or DIN EN D 1386) is preferably from 11 to 100, more preferably from 12 to 55 and especially from 12 to 30 [mg KOH/g]. The hydrolysis number is preferably from 11 to 100, preferably from 10 to 50 and especially from 20 to 30 [mg KOH/g] (to DIN EN D-1387).

Processes for preparation are known to those skilled in the art, and so there is no need for any further details on this subject.

As component D), the inventive molding materials comprise 0.05 to 3, preferably 0.1 to 1.5%, and especially 0.1 to 1% by weight of a heat stabilizer, preferably of a Cu stabilizer, preferably of a Cu(I) halide, especially in a mixture with an alkali metal halide, preferably KI, especially in a ratio of 1:4.

Useful salts of monovalent copper are preferably copper(I) acetate, and copper(I) chloride, bromide and iodide. They are present in amounts of 5 to 500 ppm of copper, preferably 10 to 250 ppm, based on polyamide.

The advantageous properties are obtained especially when the copper is present in molecular distribution in the polyamide. This is achieved when a concentrate comprising the polyamide, a salt of monovalent copper and an alkali metal halide is added in the form of a solid homogeneous solution to the molding material. A typical concentrate consists, for example, of 79 to 95% by weight of polyamide and 21 to 5% by weight of a mixture of copper iodide or bromide and potassium iodide. The concentration of copper in the solid homogeneous solution is preferably between 0.3 and 3% and especially between 0.5 and 2% by weight, based on the total weight of the solution, and the molar ratio of copper(I) iodide to potassium iodide is between 1 and 11.5, preferably between 1 and 5.

Suitable polyamides for the concentrate are homopolyamides and copolyamides, especially nylon-6 and nylon-6,6.

Preferred stabilizers are aromatic secondary amines in amounts of 0.05 to 3%, preferably of 0.5 to 1.5% and especially of 0.5 to 1% by weight, according to the general formula I:

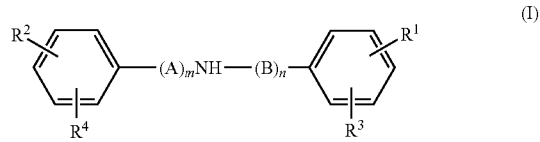

where
m, n=0 or 1,
A and B=$C_1$-$C_4$-alkyl- or phenyl-substituted tertiary carbon atom,
$R^1$, $R^2$=hydrogen or a $C_1$-$C_6$-alkyl group in the ortho or para position, which may optionally be substituted by 1 to 3 phenyl radicals, halogen, carboxyl group, or a transition metal salt of this carboxyl group, and
$R^3$, $R^4$=hydrogen or a methyl radical in the ortho or para position when m plus n is 1, or a tertiary $C_3$-$C_9$-alkyl group in the ortho or para position, which may optionally be substituted by 1 to 3 phenyl radicals, when m plus n is 0 or 1.

Preferred A or B radicals are symmetrically substituted tertiary carbon atoms, particular preference being given to dimethyl-substituted tertiary carbon. Preference is likewise given to tertiary carbons which have 1 to 3 phenyl groups as substituents.

Preferred $R^1$ or $R^2$ radicals are para-t-butyl or tetramethyl-substituted n-butyl, where the methyl groups may preferably be replaced by 1 to 3 phenyl groups. Preferred halogens are chlorine and bromine. Transition metals are, for example, those which can form transition metal salts with $R^1$ or $R^2$=carboxyl.

Preferred $R^3$ or $R^4$ radicals are hydrogen when m plus n=2, and a t-butyl radical in the ortho or para position, which may especially be substituted by 1 to 3 phenyl radicals, when m plus n=0 or 1.

Examples of secondary aromatic amines D) are
4,4'-bis(α,α'-tert-octyl)diphenylamine
4,4'-bis(α,α-dimethylbenzyl)diphenylamine
4,4'-bis(α-methylbenzhydryl)diphenylamine
4-(1,1,3,3-tetramethylbutyl)-4'-triphenylmethyldiphenylamine
4,4'-bis(α,α-p-trimethylbenzyl)diphenylamine
2,4,4'-tris(α,α-dimethylbenzyl)diphenylamine
2,2'-dibromo-4,4'-bis(α,α-dimethylbenzyl)diphenylamine
4,4'-bis(α,α-dimethylbenzyl)-2-carboxydiphenylamininickel-4,4'-bis(α,α-dimethylbenzyl)diphenylamine
2-sec-butyl-4,4'-bis(α,α-dimethylbenzyl)diphenylamine
4,4'-bis(α,α-dimethyl benzyl)-2-(α-methylheptyl)diphenylamine
2-(α-methylpentyl)-4,4'-ditrityldiphenylamine
4-α,α-dimethylbenzyl-4'-isopropoxydiphenylamine
2-(α-methylheptyl)-4'-(α,α-dimethylbenzyl)diphenylamine
2-(α-methylpentyl)-4'-trityldiphenylamine
4,4'-bis(tert-butyl)diphenylamine, and also:

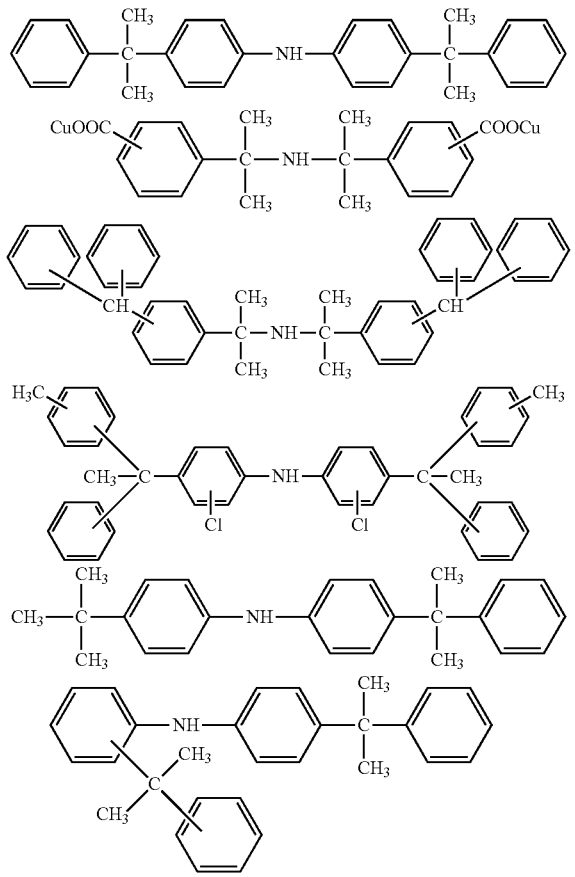

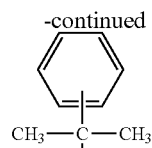

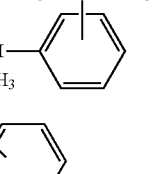

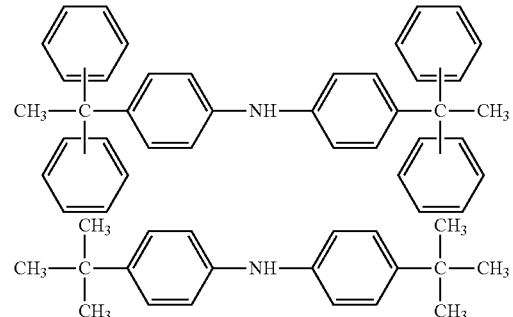

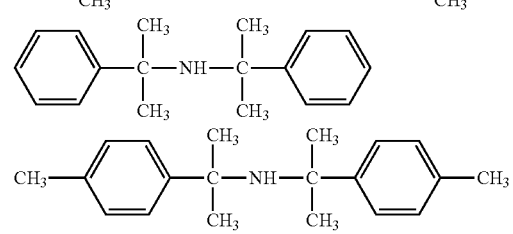

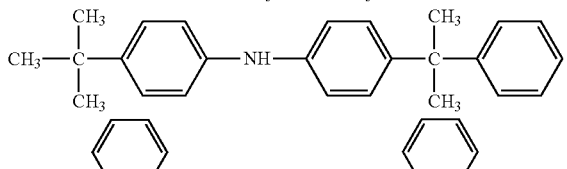

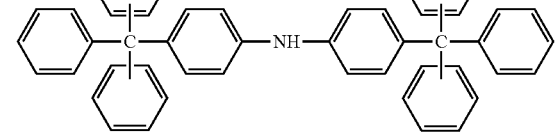

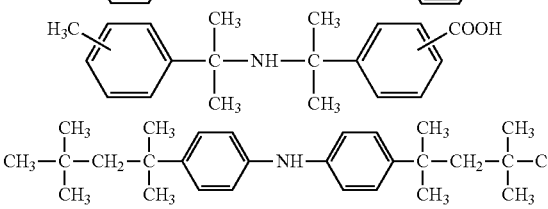

The preparation is effected by the processes described in BE-A 67/05 00 120 and CA-A 9 63 594. Preferred secondary aromatic amines are diphenylamine and derivatives thereof, which are commercially available as Naugard® (from Chemtura).

As a further component, E), the inventive thermoplastic molding materials may comprise customary processing aids such as stabilizers, oxidation retardants, further agents to counteract thermal decomposition and decomposition resulting from ultraviolet light, lubricants and demolding agents, colorants such as dyes and pigments, nucleators, plasticizers, flame retardants, rubbers, etc., in amounts of up to 40% and preferably up to 20% by weight.

Examples of oxidation retardants and heat stabilizers include phosphites and further amines (e.g. TAD), hydroquinones, various substituted members of these groups, and mixtures thereof, in concentrations up to 1% by weight, based on the weight of the thermoplastic molding materials.

UV stabilizers, which are generally used in amounts up to 2% by weight, based on the molding material, include various substituted resorcinols, salicylates, benzotriazoles and benzophenones.

It is possible to add, as colorants, inorganic pigments such as titanium dioxide, ultramarine blue, iron oxide and carbon black and/or graphite, and also organic pigments such as phthalocyanines, quinacridones, perylenes, and also dyes such as nigrosine and anthraquinones.

The nucleators added may be sodium phenylphosphinate, aluminum oxide, silicon dioxide, and preferably talc.

Flame retardants include red phosphorus, P- and N-containing flame retardants, and also halogenated flame retardant systems, and synergists thereof.

Rubbers include ethylene copolymers, EP and EPDM, and core-shell polymers.

The inventive thermoplastic molding materials can be prepared by processes known per se, by mixing the starting components in customary mixing apparatuses such as screw extruders, Brabender mixers or Banbury mixers, and then extruding the mixture. After the extrusion, the extrudate can be cooled and comminuted. It is also possible to premix individual components and then to add the remaining starting materials individually and/or likewise in a mixture. The mixing temperatures are generally 230 to 320° C.

In a further preferred mode of operation, components B) and C) and D), and optionally E), can be mixed with a prepolymer, processed and pelletized. The resulting pellets are subsequently condensed down to the desired viscosity in the solid phase under inert gas, continuously or batchwise, at a temperature below the melting point of component A).

The inventive usable molding materials are notable for good stress cracking stability and corrosion stability, especially with respect to salts, in particular with respect to $CaCl_2$ and/or zinc chloride or aqueous solutions thereof.

These molding materials are suitable for production of fibers, films and moldings of all kinds. Some preferred examples are specified below:

Domestic items, electronic components, medical appliances, motor vehicle components, housings of electrical appliances, housings of electronic components in motor vehicles, door panels, wheel surrounds, tail gates, spoilers, intake manifolds, water tanks, other tanks, fan impellers or casings, hoses, pump components, oil sumps, engine mounts, housings of power tools, housings of electronic components (in general), insert moldings of electronic components (e.g. coils, circuit boards, sensors).

EXAMPLES

The following components were used:
Component a1):
Nylon-6,6 having a viscosity number VN of 180 ml/g, measured as a 0.5% by weight solution in 96% by weight sulfuric acid at 25° C. to ISO 307. (Ultramid® A27 E from BASF SE was used).
Component a2):
Nylon-6,10 having a viscosity number VN of 144 ml/g, measured as a 0.5% by weight solution in 96% by weight sulfuric acid at 25° C. to ISO 307. (Stabamid® 7030 from Nexis Fiber AG was used).

Component B
 Chopped glass fibers for PA, diameter 10 microns.
Component C
C/1 Calcium stearate
C/2 Montanic acid
C/3 Oxidized polyethylene wax (Luwax® OA 5 BASF SE)
Molar mass (GPC) 5400
Melting point (DIN 51007 D-3418) 102-100° C.
Drip point (DIN 51801 D-3954) 107-113° C.
Acid number (DIN EN D-1386) 15-19 [mg KOH/g]
Hydrolysis number (DIN EN D-1387) 20-30 [mg KOH/g].
Heat stabilizer D/1
4,4-Bis(1,1-dimethylbenzyl)diphenylamine
D/2
CuI/KI, molar ratio 1:4
Carbon black batch E/1
Carbon black batch containing 33% by weight of carbon black and 67% by weight of polyethylene
Black batch E/2
40% by weight of nigrosine base SAPL (nigrosine from Orient Chemicals was used) and 60% by weight of PA6
Processing Conditions for Compounding
 The components were blended on a twin-screw extruder (ZSK40) at 290° C. (level temperature profile, throughput 30 kg/h), and extruded into a water bath, pelletized and dried.
Processing Conditions for Injection Molding
 The dried pellets were processed on an injection molding system at material temperature 290° C. (mold temperature 80° C.) to give standard ISO dumbbell specimens (thickness 4 mm) and to give standard ISO dumbbell specimens with a weld line in the middle of the specimens (thickness 4 mm) (specimens as for tensile tests according to ISO 527-2/1A/5).
$CaCl_2$ Stress Cracking Tests
 $CaCl_2$ stress cracking test with standard ISO dumbbell specimens
 Specimen: standard ISO dumbbell specimen (thickness 4 mm)
 Preconditioning: store injection-molded dumbbell specimen immersed in water at 80° C. for 6 days, then dry under nitrogen flow in a drying cabinet at 80° C.
 After preconditioning, clamp the dumbbell specimen on a bending jig, such that the edge fiber elongation of the specimen is 2%
Cyclical Treatment:
 Immerse dumbbell specimen on bending jig into saturated $CaCl_2$ solution (room temperature) for 30 min
 Store dumbbell specimen on bending jig in a drying cabinet at 130° C. for 2 h
 Store dumbbell specimen on bending jig in ambient air (room temperature) for 4 h
 Store dumbbell specimen on bending jig in climate-controlled cabinet at 50° C. and 95% air humidity for 17.5 h
 Repeat the cyclical treatment five times. Assessment: number of complete cycles passed through before complete fracture of a specimen on the bending jig
 $CaCl_2$ stress cracking test for dumbbell specimens with a weld line
 Specimen: dumbbell specimen with a weld line (thickness 4 mm)
 Clamp the injection-molded dumbbell specimen on a bending jig, such that the edge fiber elongation of the specimen is 1%
Cyclical Treatment:
 Immerse dumbbell specimen on bending jig into saturated $CaCl_2$ solution (room temperature) for 30 min
 Store dumbbell specimen on bending jig in a drying cabinet at 130° C. for 2 h Store dumbbell specimen on bending jig in ambient air (room temperature) for 4 h Store dumbbell specimen on bending jig in climate-controlled cabinet at 50° C. and 95% air humidity for 17.5 h Repeat the cyclical treatment five times. Assessment: number of complete cycles passed through before complete fracture of a specimen on the bending jig

TABLE 1

Blends of PA6.6 and PA6.10 compared to pure PA6.6

| Example | 1V | 2V | 1 | 2 |
|---|---|---|---|---|
| Component [% by weight] | | | | |
| a1 | 67.88 | 50.92 | 40.70 | 33.96 |
| a2 | — | 16.96 | 27.18 | 33.92 |
| B | 30.00 | 30.00 | 30.00 | 30.00 |
| Calcium stearate C/1 | 0.25 | 0.25 | 0.25 | 0.25 |
| Heat stabilizer D/1 | 0.70 | 0.70 | 0.70 | 0.70 |
| E/1 | 0.67 | 0.67 | 0.67 | 0.67 |
| E/2 | 0.50 | 0.50 | 0.50 | 0.50 |
| Total | 100.00 | 100.00 | 100.00 | 100.00 |
| CaCl$_2$ test (total number of fractured specimens before completion of the cycle in question) (total of 5 specimens used per material) (test with standard tensile specimens) | | | | |
| 1st cycle | 5 | 5 | 0 | 0 |
| 2nd cycle | — | — | 0 | 0 |
| 3rd cycle | — | — | 0 | 0 |
| 4th cycle | — | — | 0 | 0 |
| 5th cycle | — | — | 0 | 0 |

TABLE 2

Cu-stabilized blends composed of PA6.6 and PA6.10 compared to non-Cu-stabilized blends)

| Example | 1 | 2 |
|---|---|---|
| Component [% by weight] | | |
| a/1 | 34.29 | 34.16 |
| a/2 | 34.29 | 34.15 |
| B | 30.00 | 30.00 |
| C/1 | 0.25 | 0.25 |
| D/2 | — | 0.27 |
| E/1 | 0.67 | 0.67 |
| E/2 | 0.50 | 0.50 |
| Total amount | 100.00 | 100.00 |
| CaCl$_2$ test (total number of fractured specimens before completion of the cycle in question) (total of 5 specimens used per material) (test with tensile specimens with weld line) | | |
| 1st cycle | 0 | 0 |
| 2nd cycle | 4 | 3 |
| 3rd cycle | 4 | 4 |
| 4th cycle | 4 | 4 |
| 5th cycle | 5 | 4 |

TABLE 3

| Example | 1 | 2 | 3 | 4 |
|---|---|---|---|---|
| Component [% by weight] | | | | |
| a/1 | 40.70 | 40.70 | 40.70 | 40.70 |
| a/2 | 27.13 | 26.5 | 27.13 | 27.13 |
| B | 30.00 | 30.00 | 30.00 | 30.00 |
| C/1 | 0.30 | 0.93 | — | — |
| C/2 | — | — | — | 0.30 |
| C/3 | — | — | 0.30 | — |
| D/1 | 0.70 | 0.70 | 0.70 | 0.70 |
| E/1 | 0.67 | 0.67 | 0.67 | 0.67 |
| E/2 | 0.50 | 0.50 | 0.50 | 0.50 |
| Total | 100.00 | 100.00 | 100.00 | 100.00 |
| CaCl$_2$ test (total number of fractured specimens before completion of the cycle in question) (total of 5 specimens used per material) (test with tensile specimens with weld line) | | | | |
| 1st cycle | 1 | 5 | 2 | 2 |
| 2nd cycle | 5 | — | 2 | 3 |
| 3rd cycle | — | — | 2 | 4 |
| 4th cycle | — | — | 5 | 4 |
| 5th cycle | — | — | 5 | 4 |

The invention claimed is:

1. A method comprising producing a thermoplastic molding material comprising
   A) 10 to 98.8% by weight of a mixture formed from
      a1) 40 to 70% by weight of nylon-6,6 or nylon-4,6 or nylon-6 or mixtures thereof,
      a2) 30 to 60% by weight of a polyamide having a ratio of methylene to amide groups of 7 to 12,
   B) 1 to 50% by weight of a fibrous or particulate filler,
   C) 0.05 to 3% by weight of an ion-free lubricant,
   D) 0.05 to 3% by weight of a heat stabilizer,
   E) 0 to 40% by weight of further additives,
   where the sum of the percentages by weight A) to E) and a1) and a2) adds to 100% by mixing components A) through E) to form a mixture, and then extruding the mixture, and producing a stress cracking- and corrosion-resistant molding comprising the mixture.

2. The method according to claim 1, wherein the thermoplastic molding material is used to produce moldings which are resistant to CaCl$_2$ and/or zinc chloride or aqueous solutions thereof.

3. The method according to claim 1, wherein component a1) is present in amounts of 60 to 50% by weight and a2) is present in amounts of 40 to 50% by weight in the molding materials, based on 100% of A).

4. The method according to claim 1, wherein component C) is an oxidized polyolefin wax or a higher fatty acid having 10 to 44 carbon atoms.

5. The method according to claim 1, wherein component D) comprises Cu(I) halide in a mixture with KI in a molar ratio of 1:4.

6. The method according to claim 1, wherein component D) is formed from an aromatic secondary amine.

7. A molding, fiber or film obtained from the usable molding materials according to claim 1.

8. The molding according to claim 7, which is used as a domestic item, electronic component, medical appliance, motor vehicle component, housing of an electrical appliance, housing of an electronic component in a motor vehicle, wheel surround, door panel, tail gate, spoiler, intake manifold, water tank, other tank, fan impeller or casing, hose, pump component, oil sump, engine mount, housing of a power tool, housing of electronic components (in general), insert molding of electronic components (e.g. coils, circuit boards, sensors).

* * * * *